(12) United States Patent
Zagoroff

(10) Patent No.: US 7,695,043 B2
(45) Date of Patent: *Apr. 13, 2010

(54) TRUCK TAILGATE WITH MOTION CONTROL DEVICES

(76) Inventor: Dimiter S. Zagoroff, 55 Winter St., Lincoln, MA (US) 01773

( * ) Notice: Subject to any disclaimer, the term of this patent is extended or adjusted under 35 U.S.C. 154(b) by 0 days.

This patent is subject to a terminal disclaimer.

(21) Appl. No.: 12/148,981

(22) Filed: Apr. 24, 2008

(65) Prior Publication Data

US 2008/0277960 A1 Nov. 13, 2008

Related U.S. Application Data

(63) Continuation-in-part of application No. 11/600,305, filed on Nov. 15, 2006, which is a continuation-in-part of application No. 11/490,836, filed on Jul. 21, 2006, now abandoned.

(60) Provisional application No. 60/926,098, filed on Apr. 25, 2007, provisional application No. 60/701,296, filed on Jul. 21, 2005.

(51) Int. Cl.
*B62D 33/03* (2006.01)

(52) U.S. Cl. .............................. 296/57.1; 296/50; 49/339

(58) Field of Classification Search .................. 296/50, 296/57.1, 146.8; 49/339, 340, 341
See application file for complete search history.

(56) References Cited

U.S. PATENT DOCUMENTS

| | | | |
|---|---|---|---|
| 5,358,301 A | 10/1994 | Konchan et al. | |
| 5,988,724 A | 11/1999 | Wolda | |
| 6,357,813 B1 | 3/2002 | Vandeberghe et al. | |
| 6,637,796 B1 | 10/2003 | Westerdale et al. | |
| 6,773,047 B2 | 8/2004 | Gruber | |
| 6,811,208 B1 | 11/2004 | Kettinger | |
| 6,820,910 B1 | 11/2004 | Tan et al. | |
| 6,846,030 B2 | 1/2005 | Koehler et al. | |
| 6,854,781 B2 | 2/2005 | Roach | |
| 6,874,837 B2 | 4/2005 | Bruford et al. | |
| 6,905,156 B2 | 6/2005 | Miller et al. | |
| 6,994,390 B2 | 2/2006 | Zagoroff | |
| 7,140,661 B1 | 11/2006 | Schemm | |
| 7,147,260 B2* | 12/2006 | Eschebach et al. | 296/57.1 |
| 7,213,857 B2* | 5/2007 | Austin | 296/50 |
| 7,281,746 B2 | 10/2007 | Austin | |
| 7,322,630 B2* | 1/2008 | Eschebach et al. | 296/57.1 |
| 7,547,055 B2* | 6/2009 | Stratten | 296/57.1 |
| 2004/0108743 A1* | 6/2004 | Gruber | 296/57.1 |
| 2004/0262938 A1 | 12/2004 | Bruford et al. | |
| 2004/0262939 A1 | 12/2004 | Miller et al. | |
| 2005/0194808 A1 | 9/2005 | Austin | |
| 2006/0055197 A1* | 3/2006 | Austin | 296/50 |
| 2006/0082181 A1* | 4/2006 | Austin | 296/57.1 |
| 2006/0202500 A1* | 9/2006 | Eschebach et al. | 296/57.1 |
| 2007/0096492 A1 | 5/2007 | Austin | |

* cited by examiner

*Primary Examiner*—Patricia L Engle
(74) *Attorney, Agent, or Firm*—Hamilton, Brook, Smith & Reynolds, PC

(57) ABSTRACT

A tailgate control mechanism used to exert a force on a pivot. The tailgate may include a pivoting main body and a pivot fixed to a truck bed, where the main body may move about the pivot. The tailgate may also include a piston element including a first end connected to the pivot and a second end connected to the main body. The second end may be positioned above the first end when the main body is in a closed position. The piston element may also be configured to provide a counter force as the main body is lowered. The piston element may also be retrofitted.

12 Claims, 9 Drawing Sheets

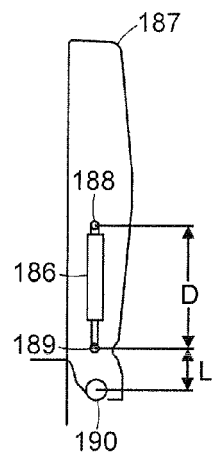
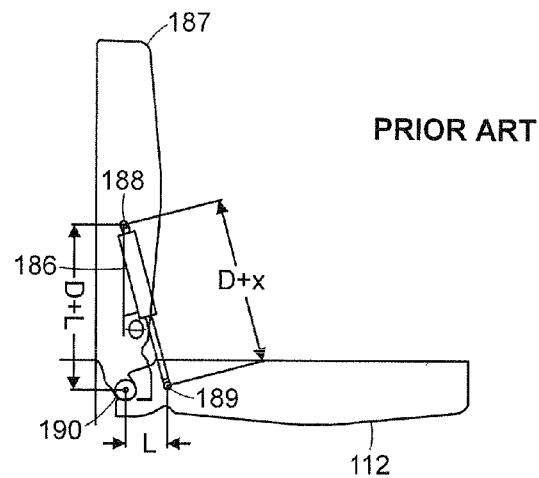
PRIOR ART
FIG. 1C
PRIOR ART
FIG. 1D
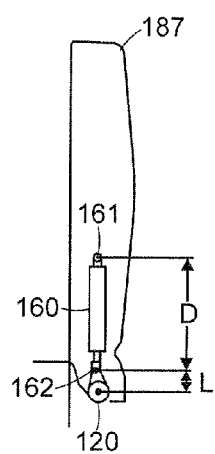
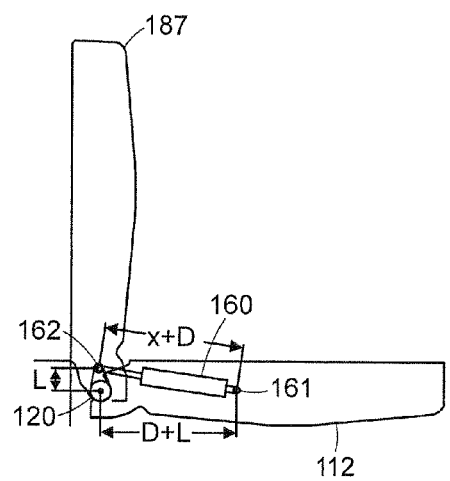
FIG. 1E
FIG. 1F

TRUCK TAILGATE WITH MOTION CONTROL DEVICES

RELATED APPLICATIONS

This application is a continuation-in-part of U.S. application Ser. No. 11/600,305, filed Nov. 15, 2006, which is a continuation-in-part of U.S. application Ser. No. 11/490,836, filed Jul. 21, 2006, now abandoned which claims the benefit of U.S. Provisional Application No. 60/701,296, filed on Jul. 21, 2005. This application also claims the benefit of U.S. Provisional Application No. 60/926,098, filed on Apr. 25, 2007. The entire teachings of the above applications are incorporated herein by reference.

BACKGROUND

Tailgates for pickup trucks typically range in weight from 40 to 60 pounds and are hinged at the rear of a truck bed such that when the tailgate is unlocked by the pulling of a lever or handle, the tailgate opens to a point level with the truck bed where it is restrained, usually by detachable folding straps. Typically, the tailgates can be removed from the truck body when the tailgate is pivoted to a partially open tailgate removal position.

The weight of the tailgate precludes one handed operation for any but the strongest individual. People of normal build have to use their second hand, shoulder or knee to raise the tailgate or to support the tailgate in an effort to keep it from dropping too quickly. Often it is the case where an individual opening a tailgate will only have one free hand, thus causing a strain in the wrist of the individual as the wrist must bear the weight of the tailgate.

Normally a person drops the gate or sometimes raises his or her knee in order to arrest the fall of the tailgate. By so doing, the individual has a chance of being injured if the tailgate falls on the knee by this process. The raising of one's knee to prevent the tailgate from dropping has reportedly resulted in crushed knee caps or other damage to the knee. It will be appreciated that a free falling tailgate can, in fact, crush anything that is underneath it and can, for instance, hurt children who are standing at the back of the tailgate when it falls.

One common solution to counterbalancing the weight of the tailgate is by the use of a torque rod that is fixed to the tailgate at one end and coupled to the truck body at the other end (U.S. Pat. No. 5,358,301, US2005/0194808A1 et al).

Dampers have been employed to achieve a controlled rate of descent. One solution utilizes a spring with viscous damping that is mounted between the tailgate and the truck body and controls the motion of the tailgate with a bell crank and an actuation shaft (U.S. Pat. No. 6,773,047 B2). Another attempted solution has been a power tailgate installation described in U.S. Pat. No. 6,357,813 that consists of a motor mounted on the truck that actuates the tailgate by a crank arm and a sliding component.

SUMMARY

A problem with prior art methods of counterbalancing the weight of the tailgate is that the additional number of parts necessary to control the tailgate are exposed to road grit and corrosion, thus deteriorating the efficiency of the counter balance. In order to minimize the effects of corrosion, other solutions have mounted the spring and damper internal to the tailgate to provide a protected environment as in U.S. Pat. Nos. 6,820,910 B1 and 6,854,781 B2. Both of these solutions rely on cables that unreel from the interior of the tailgate and attach to the truck body to control its motion. Intricate fair lead mechanisms are required to minimize chafing as the cables unreel from the tailgate in a direction that changes progressively as the tailgate pivots. The cables are exposed when the gate is in the open position. This sliding component complicates the easy removal and installation of the tailgate and the whole mechanism is exposed to road grit and corrosion.

Thus, it would be desirable to control the opening and closure of a tailgate with modules that are internal to the tailgate for protection from corrosion whilst facilitating the easy removal and installation of the tailgate in the conventional way.

According to an aspect of the present invention, motion control devices are mounted inside a tailgate and coupled to a rotating shaft therein, such as a torque rod. Tailgates are generally formed by an inside and an outside panel and a right and left sidewall that defines a box like structure with an enclosed interior space. The tailgate hinges on bushings. A torque rod is generally installed with one end fixed to the tailgate at one side thereof and the other end fixed to a pivot body which rotates inside one of the bushings at the opposite side of the tailgate. The pivot body engages the truck body via an elongated pin that facilitates easy removal of the tailgate but limits rotation relative to the truck body. While the pivot body does not rotate relative to the truck, it does rotate relative to the tailgate as it opens and closes; that is, the pivot body remains fixed to the truck body as the tailgate rotates. A principal feature of this invention is to make use of this relative rotation of the pivot body to control the motion of the tailgate from within the tailgate.

A mechanism mounted inside the tailgate for controlling the drop of a tailgate is described. The control mechanism comprises a damper having a proximal end and a distal end, the proximal end of the damper coupled to a pivot body such as through a crank arm, and the distal end of the damper coupled to the tailgate, such as to a first interior side of the tailgate. The pivot body may attach to a torsion rod inside the tailgate and engage a pin fixed to the truck body outside the tailgate. The damper may comprise a viscous damper or a bumper made of a high hysteresis elastometer.

Another mechanism mounted inside the tailgate for controlling the drop of a tailgate is described. This control mechanism comprises a gas spring having a proximal end and a distal end, the proximal end of the gas spring coupled to a pivot body, such as through a crank arm, and the distal end of the gas spring coupled to the first interior side of the tailgate. The pivot body may rotate inside a bearing inside the tailgate and engage a pin fixed to the truck body outside the tailgate.

A mechanism mounted inside the tailgate for automatically closing the tailgate is also described. The mechanism comprises an electric motor geared to a pivot body. The pivot body may attach to a torsion rod inside the tailgate and engage a pin fixed to the truck body outside the tailgate as described above.

A method and mechanism for providing and a tailgate of a vehicle comprising a pivot, the pivot being fixed relative to a truck bed is disclosed. The tailgate further comprises a rod, the rod being internally mounted in the tailgate, such as on a bottom surface, and being in connectivity with the pivot and a control mechanism, the control mechanism being internally mounted in the tailgate and the control mechanism exerting a force on the rod. The rod in return exerts a rotational force on the pivot. The control mechanism may be in connection to the rod via a crank arm. The rod may be a torque rod or a shaft rod. The control mechanism, as an example, may be a damper, a motor, or a gas spring. The control mechanism may be mounted solely on one end of the tailgate. The rotational force may be used to control the lowering of the tailgate and assist in raising it.

In other example embodiments a control mechanism that may be adapted to preexisting tailgate systems is also presented. An external control mechanism may be externally retrofitted to any tailgate system in order to provide further support in the opening and closing of the tailgate.

As an example, embodiments may include a tailgate of a vehicle featuring a pivoting main body and a pivot about which the main body pivots. The pivot may be fixed relative to a truck bed. The tailgate may further include a piston element including a first end connected to the pivot and a second end connected to the main body, where the second end may be positioned above the first end when the main body is in a closed position, the piston element being configured to provide a counter force as the main body is lowered.

The piston element may be a damper or gas spring and may be retrofitted externally to the tailgate. The piston element may also be configured to rotate with and in the same direction as the main body.

The pivoting main body may also include a torque rod. The torque rod may be preexisting and internal to the pivoting main body, and/or the torque rod may be retrofitted internally or externally to the pivoting main body.

Thus the present invention facilitates ease of closing and safe and controlled opening of the tailgate in various ways, yet permits rapid removal of the tailgate from the truck body in the conventional way, while protecting the mechanism from outside debris.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIGS. 1C and 1D illustrate a prior damper mechanism used in a tailgate in a fully closed and fully opened configuration, respectively;

FIGS. 1E and 1F illustrate a damper mechanism used in a tailgate in a fully closed and fully opened configuration, respectively, according to example embodiments;

DETAILED DESCRIPTION

Figure 1A:
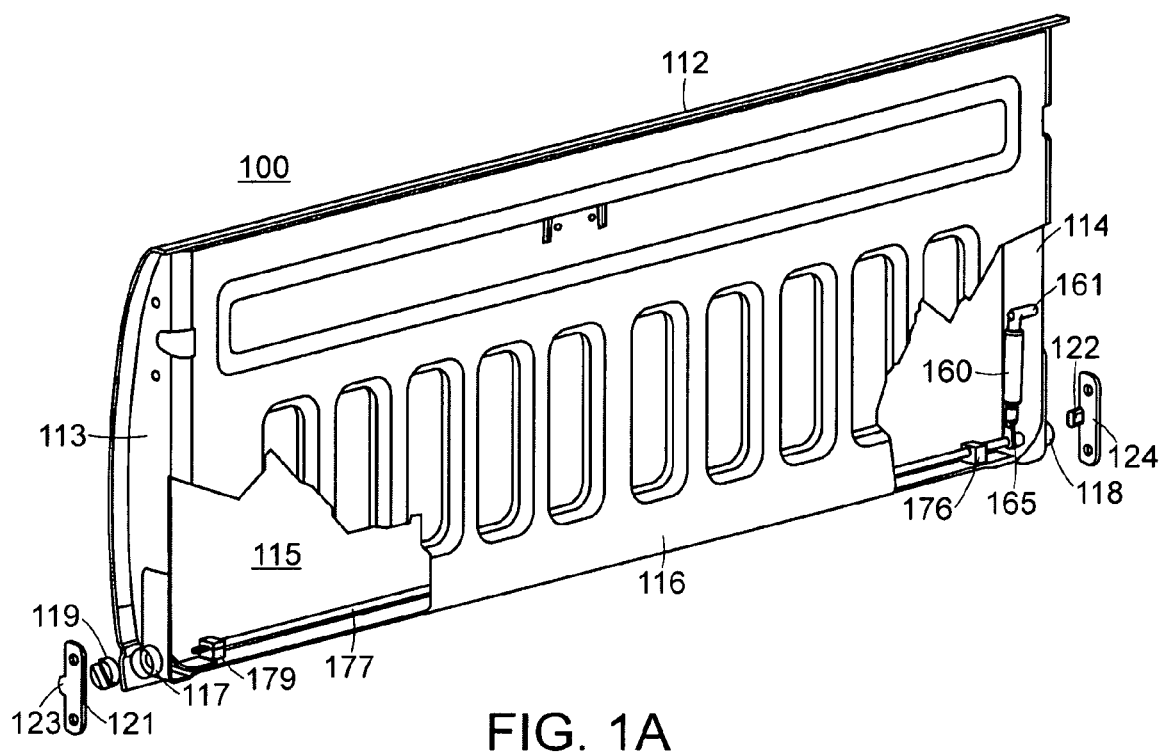
FIGS. 1A and 1B show an internal damper and torque rod disposed within a tailgate.
Figure 1B:
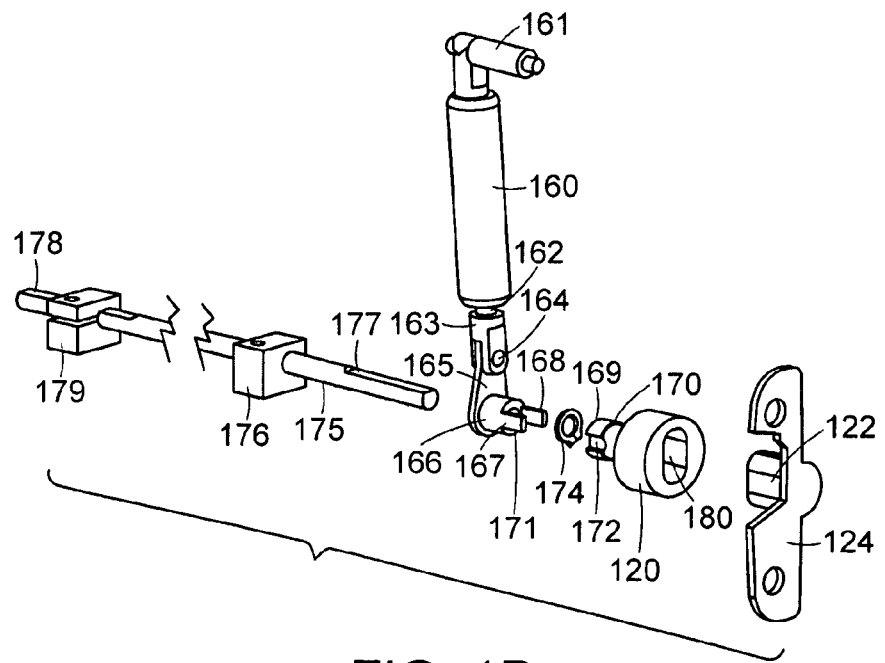

FIGS. 1A and 1B depict a tailgate featuring an internal spring and damping mechanism. FIG. 1B is an enlarged exploded view of the internal mechanism rotated clockwise. The tailgate 112 comprises side faces 113 and 114, outside face 115, and inside face 116 (partially cut away to show the interior of tailgate 112). Tailgate 112 is pivotally attached to the truck body (not shown) by bushings 117 and 118. Bushing 117 houses an insert 119 which mates with a key (hidden in this view) attached to bracket 123. Bracket 123 bolts to the truck body with two flat head bolts (not shown). Bushing 118 on the opposite side of tailgate 112 houses pivot body 120 which mates with key 122 attached to bracket 124. Bracket 124 bolts on to the truck body with two flat head bolts (not shown).

The internal damping mechanism 160 is pivotably attached to the sidewall 114 of tailgate 112 with a stanchion 161. It should be appreciated that the internal damping mechanism may be attached to either sidewall. A piston rod 162 slides in and out of the damper 160. The damper 160 is a viscous damper which exerts a retaining force on the piston rod 162 proportional to the speed of its withdrawal, thus controlling the fall of the tailgate, but only a negligible force to its insertion so as not to inhibit raising of the tailgate. The piston rod 162 terminates in a yoke 163. The yoke 163 is pivotally attached to a crank arm 165 with a pin 164. The crank arm 165 has a boss 166 with a bore for the torque rod 175. Boss 166 terminates in two fingers 167 and 168 that engage the two notches 172 and the second notch, being hidden from view, of the boss 169 of pivot body 120. Thus, through the crank arm, the damper applies a rotating force to the pivot body 120.

Fingers 167 and 168 carry a groove 171 and notches 172 and 173 carry a matching groove 170. Snap ring 174 snaps into the grooves 170 and 171 prevents the fingers from disengaging the notches.

Torque rod 175 has two flats 177 and 178 at each end. Flat 177 mates with a tight fitting bore (not shown) of the boss 169 of pivot body 120. Pivot body 120 has a slot shaped cavity 180 which engages the key 122 of the bracket 124. Flat 178 is retained by pinch block 179 mounted to the far end of the tailgate. In this manner, the pivot body 120 is restrained from rotating as the tailgate is lowered and will impart a proportional twist to the torque rod 175. This twist adds a counter-balancing torque to the weight of the tailgate. An additional restraining torque is applied to the tailgate by the damper 160 and the stanchion 161 as the rod 162 remains attached to the stationary crank arm 165 while the damper 160 and the stanchion 161 orbit around the crank arm 165. This forces the piston rod 162 to withdraw from the damper 160, creating the aforementioned retaining force. This retaining force of the damper 160 can be sized to limit the rate of descent of the tailgate to a controlled rate around 2 to 4 seconds as opposed to a nearly instantaneous drop without a damper. Additional support for the torque rod 175 to resist the thrust loads of the crank arm 165 generated in this process may be provided by a bearing pillow block 176 attached to the tailgate.

It should be appreciated that the mounting position of the internal spring and damping mechanism of FIGS. 1A and 1B differ from the mounting position of internal spring and damping mechanisms known in the art. FIGS. 1C and 1D illustrate a prior art mounting configuration of internal spring and damping mechanism when the tailgate 112 is in a closed and opened position, respectively. As shown in FIGS. 1C and 1D the upper end 188 of the damping mechanism is fixed to the truck body 187, while the lower end 189 is attached to the tailgate 112. In the closed or vertical position, the distance between the upper and lower ends 188 and 189, respectively, equals the length of the damper mechanism in its contracted position (D). The initial position of the damper mechanism is thus normal with respect to the ground within a few degrees.

As the tailgate opens to a horizontal position, as illustrated in FIG. 1D, the damper mechanism extends fully. Since the extended length of the damper mechanism can never be more than twice the contracted length the final position can never pivot more than 25° away from the initial vertical position. This may be mathematically proven by Pythagorean's Theorem for right triangles where the final position may be described as $(D+L)^2+L^2=(Dx)^2$. D is the contracted length of the damper mechanism, L is the distance between the lower end 189 of the damper and the tailgate pivot 190, and x is an extension factor associated with the elongated tailgate, where the product of Dx equals the extended length of the damper mechanism. It should be noted that using the configuration illustrated in FIGS. 1C and 1D, the maximum angle θ the damper mechanism may be displaced in the fully opened position is no more than 25°. It should also be noted that the upper end 188 of the damper mechanism 186 remains above the lower end 189 during the operation of the tailgate (e.g., in the fully opened and closed positions of the tailgate as well as all positions in between).

FIGS. 1E and 1F illustrate the opening and closing of the damper mechanism of FIGS. 1A and 1B. The damper mechanism 160 includes a reverse orientation as compared to the damper mechanism 186, where the upper end 161 is attached to the tailgate 112 and the lower end 162 is attached to the truck body 187. Similar to the damper mechanism 186 illustrated in FIGS. 1C and 1D, when the tailgate 112 is in a closed position, the damper mechanism 160 is in a substantially vertical position. However, when the tailgate 112 is in a fully opened position, the damper mechanism orbits more than 90°, depending on the distance between the lower end 162 and the tailgate pivot 120 (L). It should be noted that while the tailgate is in the fully closed position, the upper end 161 of the damper mechanism 160 is positioned above the lower end 162. As the tailgate is lowered, the upper end 161 gradually descends with the tailgate, resulting in the upper end 161 being in a lower position with respect to the lower end 162.

Figure 2A:
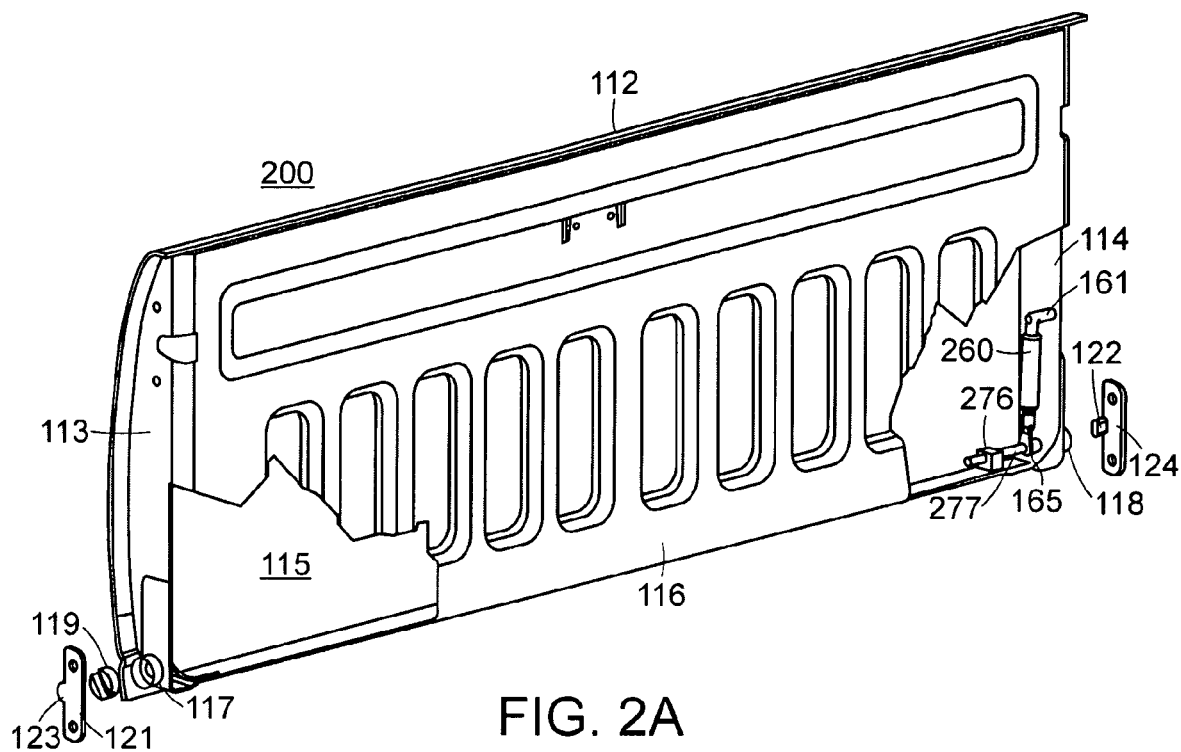
FIGS. 2A and 2B show an internal gas spring disposed within a tailgate.
Figure 2B:
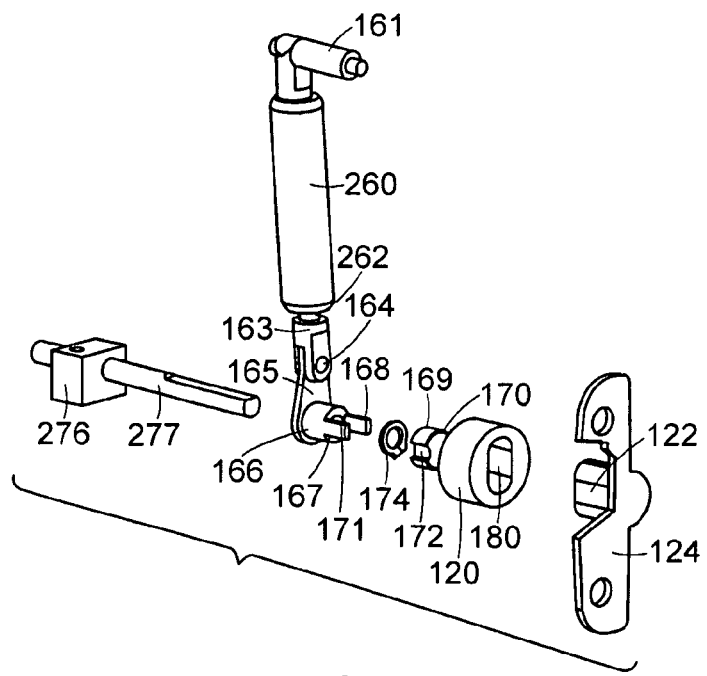

FIGS. 2A and 2B depict a tailgate a mechanism 200 with a gas spring that carries out the functions of the damper and the torque rod described above in relation to FIGS. 1A and 1B. Aside from the fact that the torque rod 175 and pinch block 179 are replaced by the shaft 277 and bearing pillow block 276, the two constructions are identical and the numerals used to designate the like components in FIGS. 1A and 1B are carried over in FIGS. 2A and 2B. Gas spring 260 is of the type known as Tension Gas Spring and exerts a spring force that retracts the piston rod 262. Additionally, gas spring 260 acts as a viscous damper which exerts a retaining force on the piston rod 262 proportional to the speed of its withdrawal. Thus, the gas spring exerts a force on the shaft 277 via the crank arm. The shaft in turn exerts a rotation force to the pivot body. The gas spring thus damps lowering of the tailgate and assists in raising it.

Figure 3A:
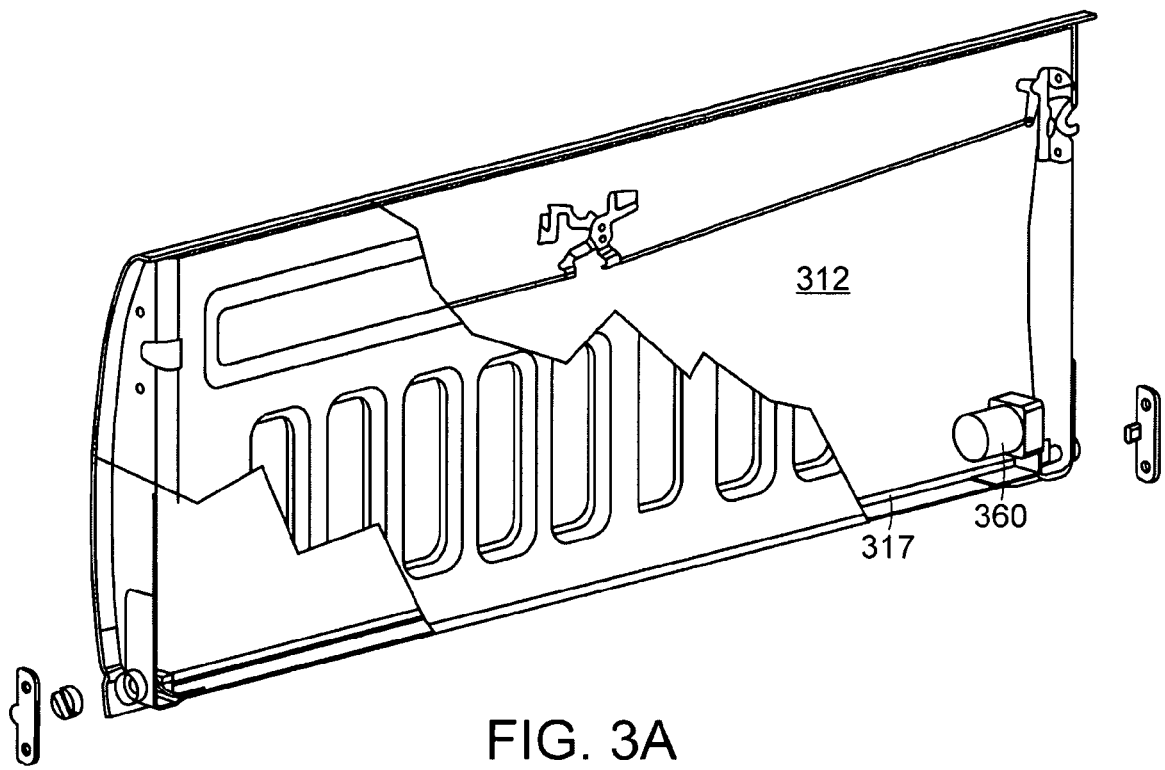
FIGS. 3A and 3B show an internal power mechanism disposed within a tailgate.
Figure 3B:
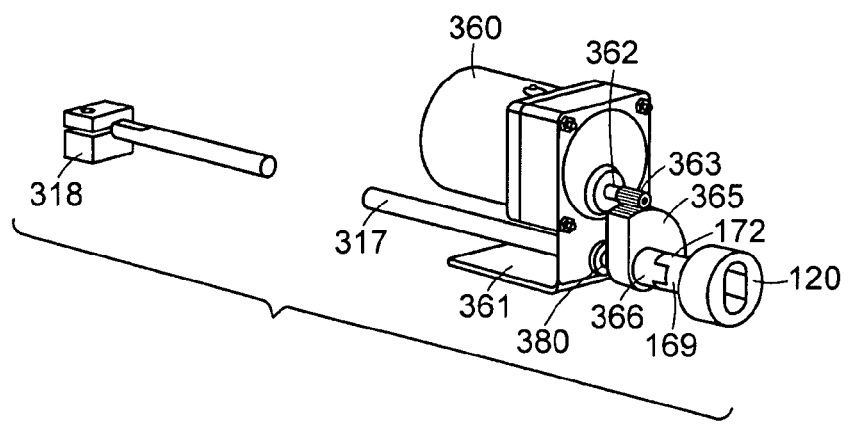

FIGS. 3A and 3B show a tailgate featuring an internal power mechanism 300 which includes a DC motor 360, a pinion gear 363, and a sector gear 365, wherein sector gear 365 is equivalent in terms of operation to crank arm 165. The pinion is attached to an output shaft 362 of the DC motor 360. The sector gear 365 mounts in place of the previously described lever 165 and is driven by the pinion gear 363 on the output shaft 362 of the reduction gear DC motor 360. The sector gear 365 carries a hub 366 with two fingers (hidden in view) that engage the two notches 172 and 173 (hidden in view) of the boss 169 of the pivot body 120. The DC motor 360 mounts on a bracket 361 that attaches to the bottom side of the tailgate 312. The bracket 361 also carries a bearing 380 that retains a torque rod 317 from bending due to the thrust loads of the pinion gears 363 and sector gear 365. The torque rod 317 attaches rigidly to the tailgate 312 inside the pinch block 318. The other end of the torque rod 317 attaches rigidly to the pivot body 120. The torque rod 317 is used to assist the motor 360 in raising the tailgate 312 and also counter balance the gravity forces when the tailgate 312 is lowered. Thus, the DC motor exerts a force on the sector gear, which in return exerts a force on the torque rod. The torque rod then exerts a rotational force on the pivot body. Therefore the sector gear operates in a similar fashion as the crank arm 165. It will be appreciated that the mechanism could also function without the use of a torque rod, alone or in conjunction with a gas spring as described in FIGS. 2A and 2B. The internal friction of the motor 360 can be utilized to slow the descend of the tailgate 312 or an additional damper may be installed as described in FIGS. 1A and 1B.

In operation, the motor 360 causes the pinion gear 363 to rotate, resulting in the rotation of sector gear 365. The rotation of sector gear 365, in turn, causes the rotation of the pivot body 320, thus exerting an opening or closing moment to the tailgate 312 depending on the direction of rotation. The operation of motor 360 may be limited to only raising the tailgate 312 by activating a suitable switch or by remote control. It may also be used to control the descend of the tailgate 312 in conjunction with an apparatus for remote opening of the tailgate as described in U.S. Pat. No. 6,994,390 B2. Motor 360 may also comprise a clutch to disengage it for manual operation.

While this invention has been particularly shown and described with references to preferred embodiments thereof, it will be understood by those skilled in the art that various changes in form and details may be made therein without departing from the scope of the invention encompassed by the appended claims.

The scope of the invention is not limited to the devices described above; other mechanical linkages may be employed, such as a cam, a drum and cable or belts or a sprocket and chain. Other motion controllers, such as a rotary damper or a detent to arrest the movement of the tailgate may be installed inside the tailgate and linked to the pivot body. In addition, any combination of the above mentioned embodiments may be used in combination. For example some of the preferred combinations may be, the damper and the torque rod, the gas spring and damper, and the motor in combination with the gas spring. It should also be appreciated that other forms of springs may be used, for example coil or torsion springs.

As may be seen from FIGS. 1A-3B, all of the components of the control motion mechanisms are disposed within the tailgate. Therefore, the control motion mechanisms are protected from cargo and road debris. Furthermore, in order to detach the tailgate from the truck body, it is no longer necessary to detach the individual components of the control motion mechanisms since they are now contained internally in the tailgate.

In other example embodiments, motion control, devices suitable for retrofitting may be employed. The retrofitted motion control devices may be used in preexisting tailgates to provide further support in balancing the weight of the tailgate during its opening and closing. The retrofitted motion control device may be used in tailgates that may or may not include a preexisting torque rod.

Figure 4A:
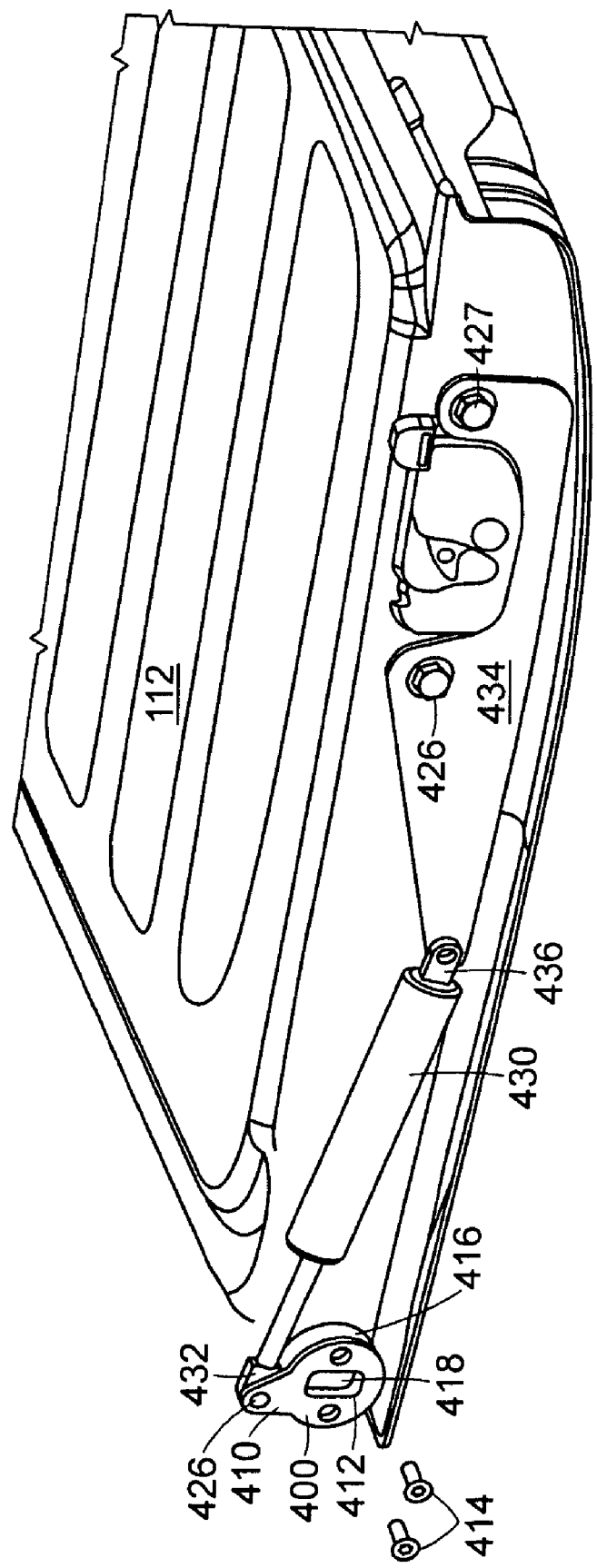
FIGS. 4A-4C show a retrofitted external damper mechanism used in a tailgate featuring a preexisting torque rod according to example embodiments.
Figure 4B:
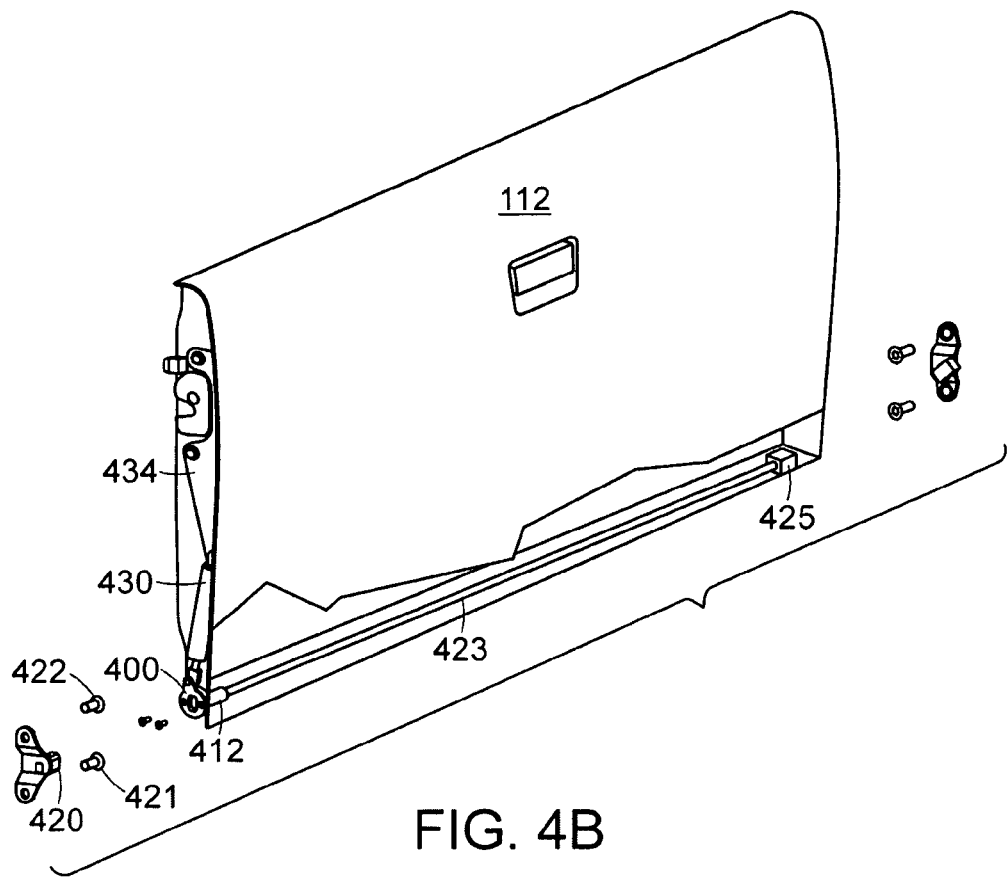
Figure 4C:
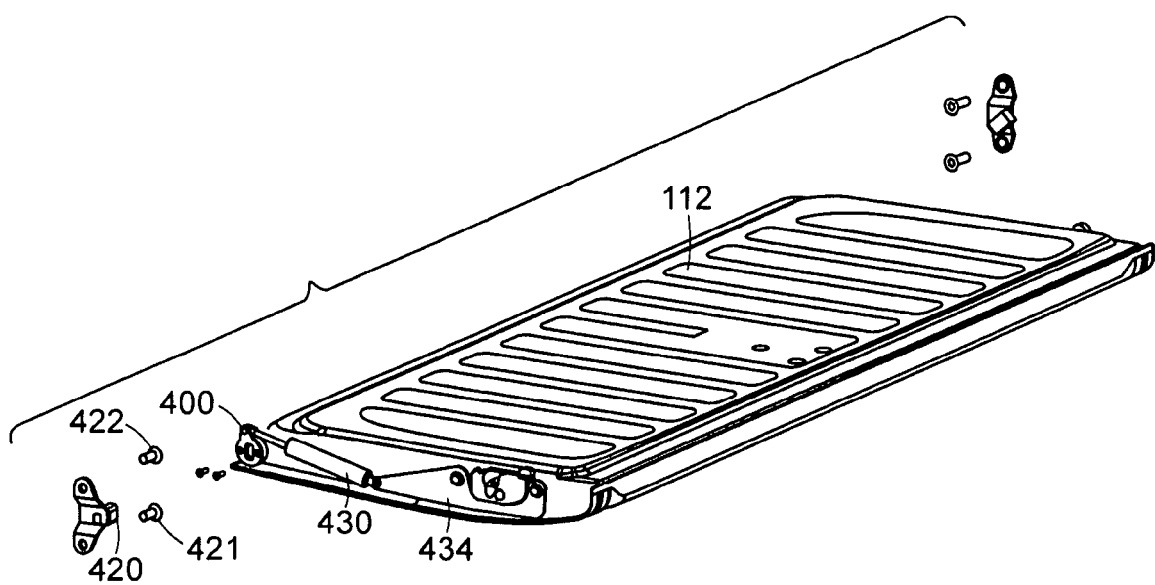

FIG. 4A-4C illustrate a retrofitted damper mechanism 430 mounted to a tailgate 112 featuring a preexisting torque rod 423 according to example embodiments. An attachment component 400 may include a crank arm 410 that may be fixed to an existing ferrule 412 by screws 414 or any other suitable means. The ferrule 412 includes an internal notch 418 that may mate with an existing oblong trunnion 420 mounted on one side of the truck bed with screws 421 and 422. The trunnion 420 holds the ferrule fixed as a cup 416 rotates with the tailgate about the ferrule. The existing torque rod 423 may be fixed to the ferrule 412 at one end and fixed to the tailgate 112 at an opposite end with a pinch block 425 as shown in the partially cut away view in FIG. 4B. The crank arm 410 may also include a pin 426 that may be pivotally attached to one end of the damper mechanism 430 by end fitting 432. The other end of the damper mechanism 430 may attach pivotally to a mounting bracket 434 by an end fitting 136. The mounting bracket 434 may attach to the tailgate 112 with screws 426 and 427. The damper mechanism 430 may be a viscous damper or a friction damper that exerts a restraining force in extension but not in compression.

In operation, as the tailgate 112 is lowered, the ferrule 412 is restrained from rotation relative to the truck by the fixed oblong trunnion 420 and must therefore rotate relative to the tailgate 112 inside the cup 416. Since the crank arm 410 is fixed to the ferrule 412, the crank arm 410 must also rotate relative to the tailgate 112. As the crank arm 410 rotates, it extends the damper mechanism 430. As the damper mechanism 430 extends, it exerts a restraining force cushioning the descent of the tailgate 112. The two stages from a fully closed to a fully open tailgate are illustrated in FIGS. 4B and 4C, respectively.

It should be appreciated that the thickness of the attachment component 400 and the crank arm 410 may be as thin as 0.062" and possibly thinner if made from a high strength alloy. Such an attachment component and crank arm may easily fit between the trunnion 420 of the truck and the ferrule 412 of the tailgate 112 without adversely affecting the existing play between the two.

Figure 5:
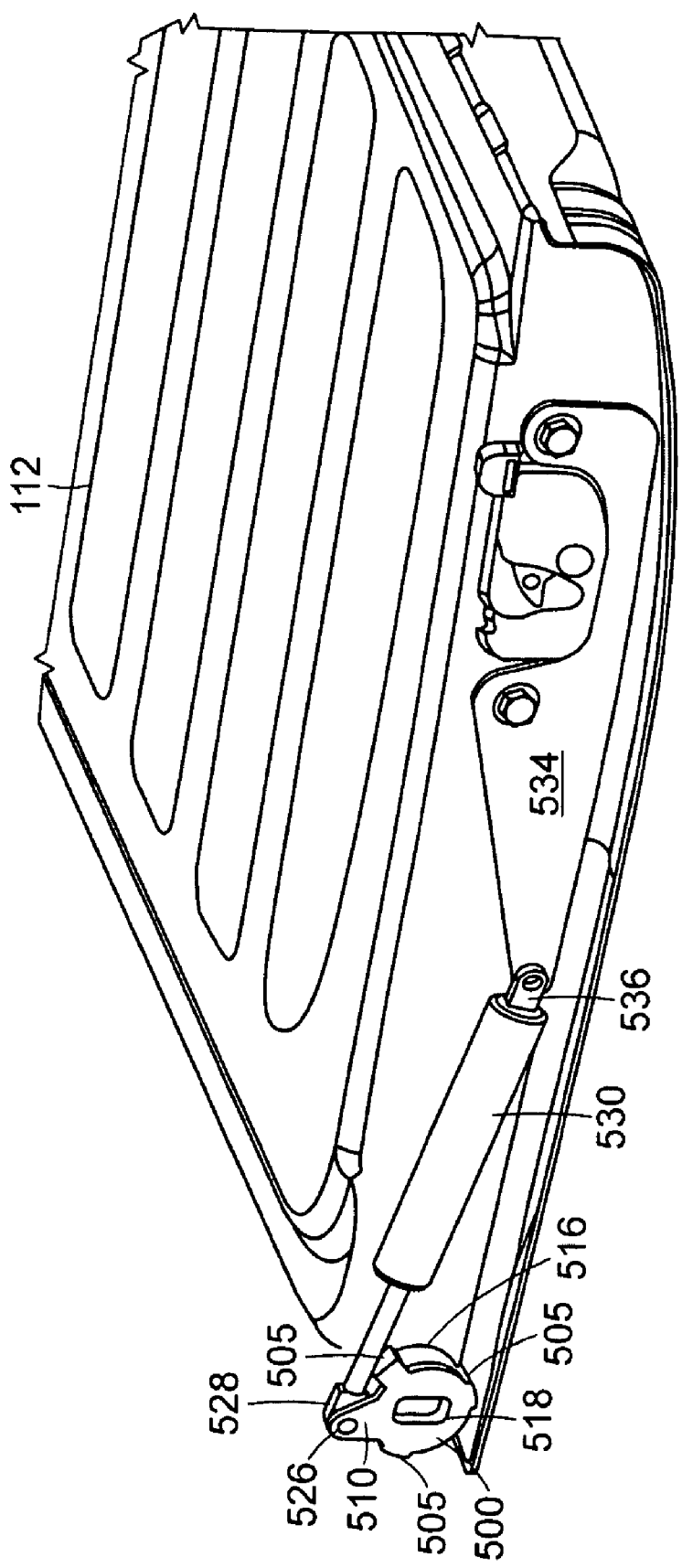
FIG. 5 illustrates a retrofitted external damper mechanism used in a tailgate featuring a preexisting torque rod according to another example embodiment.

FIG. 5 also illustrates an example embodiment of a retrofitted damper mechanism 530 employed in a tailgate 112 featuring a preexisting torque rod (not shown). The attachment component 500 of FIG. 5 differs from the attachment component 400 of FIGS. 4A-4C in that the attachment component 500 is not attached to a ferrule but is instead positioned coaxially with a cup 516 by three flanges 505 or a collar (not shown) mating with the outside diameter of the cup 516. In this manner the attachment component 500 may rotate relative to the tailgate 112. The attachment component 500 may include a slot 518 that may mate with the existing oblong trunnion 520 mounted on one side of the truck bed. The damper mechanism 530 may also include end fittings 528 and 536, a crank arm 510, a pin 526, and a mounting bracket 534 that may function in the manner described in relation to FIGS. 4A-4C.

In operation, the damper mechanism of FIG. 5 may operate in a similar manner to the damper mechanism of FIGS. 4A-4C with the exception that the damper mechanism 530 does not rely on the ferrule to restrain it from rotating relative to the truck body but relies on the slot 518 that engages the trunnion (420, FIGS. 4B and 4C) to keep the attachment component 500 aligned with the truck body. The attachment component 500 is held in place axially by flanges 505 and transversely by the lateral rigidity of the linkage made up of the crank arm 510, the pin 526, the damper mechanism 530, and end fittings 518 and 536. To assure that the slot 518 is aligned correctly to facilitate the installation of the tailgate 112, the damper mechanism 530 may include an internal spring (not shown) that retracts the damper and aligns the crank arm 210.

Figure 6:
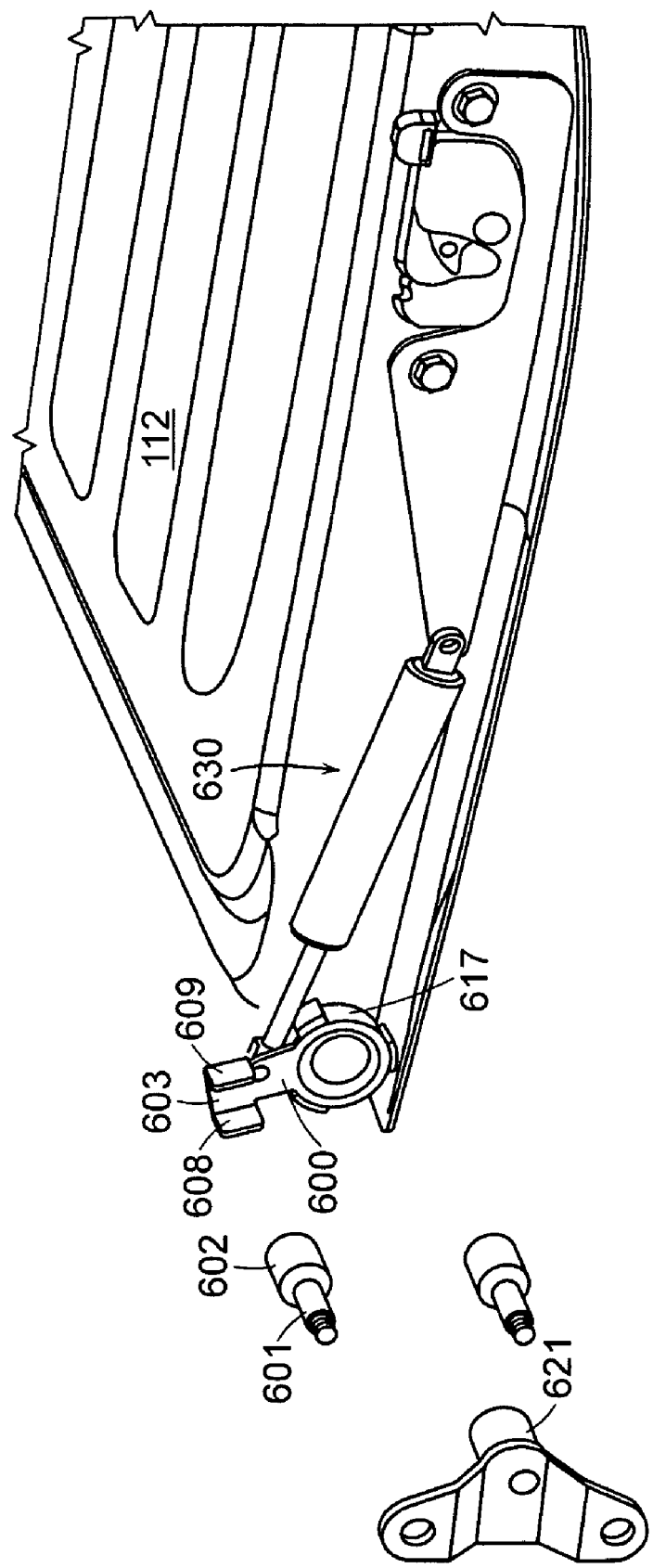
FIG. 6 shows a retrofitted external damper mechanism used in a tailgate system that does not feature a preexisting torque rod according to example embodiments.

FIG. 6 illustrates another example embodiment including a retrofitted damper mechanism 630 employed in a tailgate 112 that does not include a preexisting torque rod. Trucks that do not feature torque rods typically include a cylindrical trunnion 621 that may be configured to mate with a cup 617. In order to adapt to the cylindrical trunnion 621, the damper mechanism configuration of FIG. 6 includes a modification made with respect to the configuration illustrated in FIG. 5. The modification may include two additional components. The first component may be a post that is attached to the truck panel that faces the side of the tailgate 112. As an example, a mounting screw 601 featuring a raised head 602 with respect to the trunnion may serve as such a pin. The second component may be a notch 603 that may be formed at the side of the attachment component 600. The notch 603 may be formed by two sides 608 and 609 that engage the raised head 602 and prevent the rotation of the attachment component 600 relative to the truck as the tailgate 112 is swung open and closed.

Figure 7A:
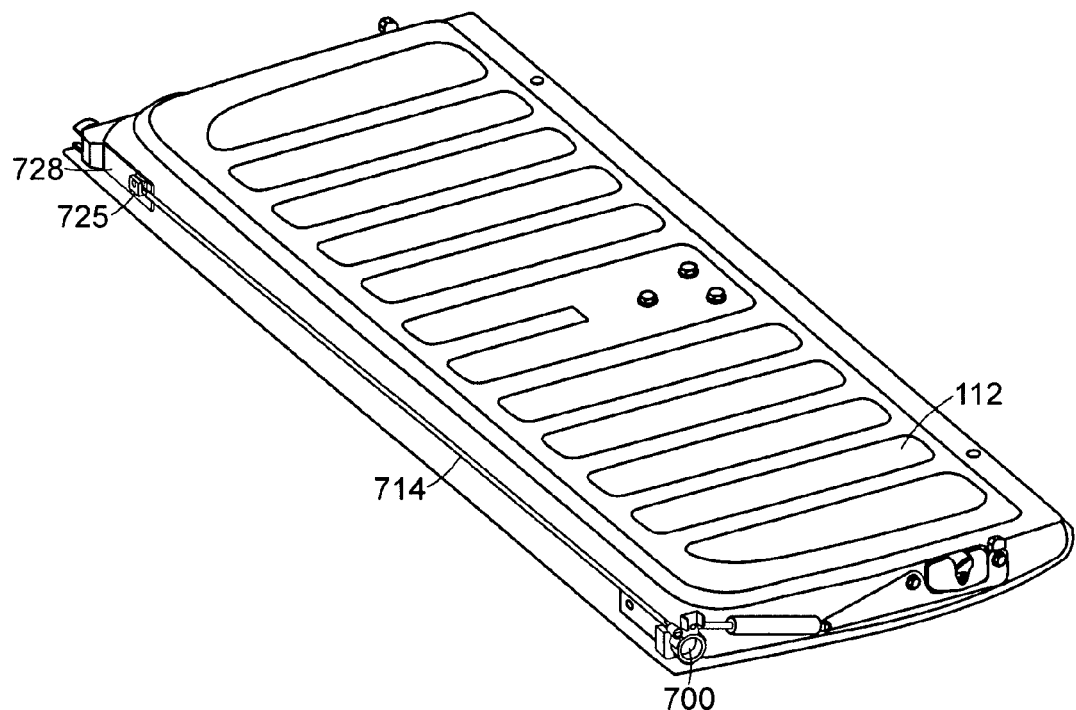
FIGS. 7A and 7B illustrate a retrofitted external damper mechanism and a retrofitted external torque rod used in a tailgate according to example embodiments.
Figure 7B:
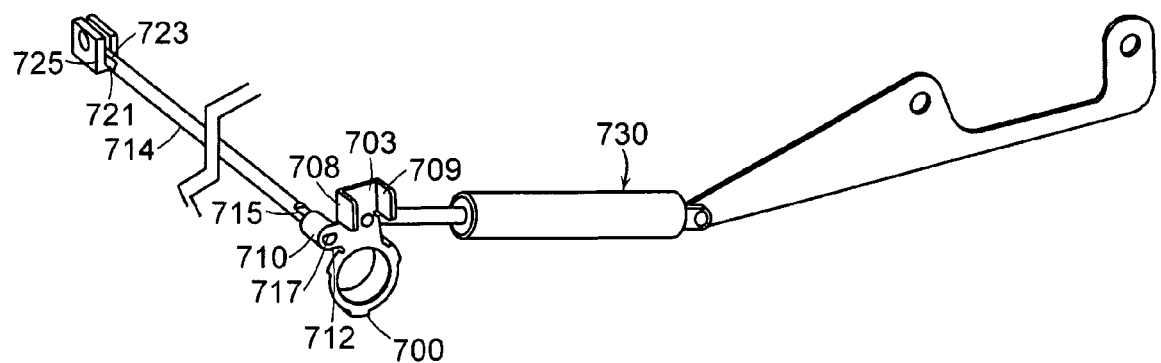

FIGS. 7A and 7B illustrate another example embodiment where a retrofitted damping mechanism 730 and a retrofitted external torque rod 714 are employed in a tailgate 112 that does not feature a preexisting torque rod. The attachment component 700 may be similar to the attachment component 600 described in relation to FIG. 6. The attachment component 700 may also include a notch 703 and sides 708 and 709 that may mate with a post mounted on the truck body (not shown) to prevent the rotation of the attachment component 700. The attachment component 700 may also include a boss 710 with a bore 712 to accept the external torque rod 714. The end of the torque rod 714 may include a flat 715 that may mate with the flat 717 of the bore 712 to prevent the rotation of the torque rod 714 but may allow axial sliding. Other means such as a key and a groove may serve the same purpose. The other end of the torque rod 714 may also include a flat 721 that may mate with a flat 723 of a pinch block 725. The pinch block 725 may attach to the underside 728 of the tailgate 112.

In operation, the end of the torque rod 714 near the attachment component 700 remains stationary while the other end that is attached to the underside of the tailgate 112 orbits around the axis of rotation of the tailgate and rotates with it. As that end of the torque rod rotates while the other end remains stationary, it imparts a twist to the torque rod 714 which exerts a counter balancing turning moment to the tailgate 112. The play between the various components, or the sliding joint between the torque rod 714 and the boss 710 can compensate for the small axial misalignment which results from the fact that the torque rod 714 does not rotate exactly along the axis of rotation of the tailgate 112.

It should be appreciated that although the illustrated examples of the attachment components of FIGS. 4A-7B are all positioned on the driver's side of the tailgate, the attachment components may also be positioned on the passenger side of the tailgate. It should also be appreciated that a locking mechanism may also be used in conjunction with the retrofitted motion control devices in order to lock the tailgate in its fully opened position.

What is claimed is:
1. A tailgate of a vehicle comprising:
a pivoting main body;
a pivot about which the main body pivots, the pivot being at a fixed location relative to a truck bed; and
a piston element comprising a first end connected to the truck bed at an offset position above the axis of rotation of the pivot and a second end connected at a fixed loca- tion to the main body, with the second end being positioned above the first end when the main body is in a closed position, the piston element being configured to extend and to provide a torque about the pivot in a direction opposite to the direction of rotation as the main body is lowered, the piston element rotating with and in the same direction as the main body about its first end.

2. The tailgate of claim 1 wherein the piston element is a damper.

3. The tailgate of claim 1 wherein the piston element is a gas spring.

4. The tailgate of claim 1 wherein the piston element is retrofitted.

5. The tailgate of claim 1 wherein the pivoting main body includes a preexisting internal torque rod.

6. The tailgate of claim 1 wherein the pivoting main body includes an external retrofitted torque rod.

7. A method for providing a tailgate comprising:
providing a pivoting main body;
fixing a pivot, about which the main body pivots, to a truck bed;
mounting a first end of a piston element to the truck bed at an offset position above the axis of rotation of the pivot;
mounting a second end of the piston element at a fixed location to the main body in a maimer that the second end is positioned above the first end when the main body is in a closed position; and
the piston element extending and providing a torque about the pivot in a direction opposite to the direction of rotation as the main body is lowered, the piston element rotating with and in the same direction as the main body about its first end.

8. The method of claim 7 wherein the piston element is a damper.

9. The method of claim 7 wherein the piston element is a gas spring.

10. The method of claim 7 wherein mounting the first and second ends of the piston element further includes retrofitting.

11. The method of claim 7 wherein providing the counter force further includes the use of a preexisting torque rod internally attached to the pivoting main body.

12. The method of claim 7 wherein providing the counter force further includes the use of a retrofitted torque rod externally attached to the pivoting main body internally.

\* \* \* \* \*

UNITED STATES PATENT AND TRADEMARK OFFICE
CERTIFICATE OF CORRECTION

PATENT NO. : 7,695,043 B2
APPLICATION NO. : 12/148981
DATED : April 13, 2010
INVENTOR(S) : Dimiter S. Zagoroff It is certified that error appears in the above-identified patent and that said Letters Patent is hereby corrected as shown below:

In Column 10, Claim 7, line 2, delete "maimer" and insert --manner--.

Signed and Sealed this

Twenty-fifth Day of May, 2010

David J. Kappos
*Director of the United States Patent and Trademark Office*